(12) United States Patent
Bertolina et al.

(10) Patent No.: US 12,552,318 B2
(45) Date of Patent: Feb. 17, 2026

(54) ADAPTIVE CAMERA SYSTEM FOR A VEHICLE AND VEHICLE COMPRISING THE ADAPTIVE CAMERA SYSTEM AND METHOD FOR OPERATING THE ADAPTIVE CAMERA SYSTEM

(71) Applicant: ZF CV SYSTEMS GLOBAL GMBH, Bern (CH)

(72) Inventors: Guillermo Bertolina, Brussels (BE); Tobias Klinger, Springe (DE); Rodrigo Magalhaes Pereira, Munich (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 18/713,266

(22) PCT Filed: Nov. 29, 2021

(86) PCT No.: PCT/EP2021/083335
§ 371 (c)(1),
(2) Date: May 24, 2024

(87) PCT Pub. No.: WO2023/094007
PCT Pub. Date: Jun. 1, 2023

(65) Prior Publication Data
US 2025/0026270 A1    Jan. 23, 2025

(51) Int. Cl.
*B60R 1/22* (2022.01)
*H04N 23/661* (2023.01)
*H04N 23/90* (2023.01)

(52) U.S. Cl.
CPC ............. *B60R 1/22* (2022.01); *H04N 23/661* (2023.01); *H04N 23/90* (2023.01); *B60R 2300/105* (2013.01)

(58) Field of Classification Search
CPC .... B60R 1/22; B60R 1/23; B60R 1/28; B60R 2300/105; B60R 2300/404; B60R 2300/70; B60R 2300/80
See application file for complete search history.

(56) References Cited

U.S. PATENT DOCUMENTS 9,656,608 B2     5/2017  Mcmahon et al.
10,818,109 B2 *  10/2020 Palmer ................. G07C 5/0841
(Continued)

FOREIGN PATENT DOCUMENTS

DE      102020204957 A1     4/2021

*Primary Examiner* — Boubacar Abdou Tchoussou
(74) *Attorney, Agent, or Firm* — LEYDIG, VOIT & MAYER, LTD.

(57) ABSTRACT

An adaptive camera system for a vehicle, including a plurality of camera arrangements each including at least one camera unit, wherein each camera arrangement is arranged on the vehicle and configured to have respective different optical properties to cover a respective different field of view and/or to have a respective different spectral response. The plurality of camera arrangements are adapted to be connected in data-communication to an image processor configured to receive image data from the camera arrangement. The system further includes a camera arrangement selector configured to receive driving-status data pertaining to an actual status of the vehicle. The camera arrangement selector is adapted to select from the plurality of camera arrangements, using the driving-status data, at least one preferred camera arrangement for being connected in data-communication to the image processor. A data-communication connection to the image processor is restricted to the at least one preferred camera arrangement.

15 Claims, 7 Drawing Sheets

(56) References Cited

U.S. PATENT DOCUMENTS

| | | | | |
|---|---|---|---|---|
| 11,180,090 B2* | 11/2021 | Yoshizaki | ................ | B60R 1/28 |
| 11,433,813 B2* | 9/2022 | Kubota | ................ | B60R 1/006 |
| 2017/0330397 A1* | 11/2017 | Palmer | ................ | G07C 5/0841 |

* cited by examiner

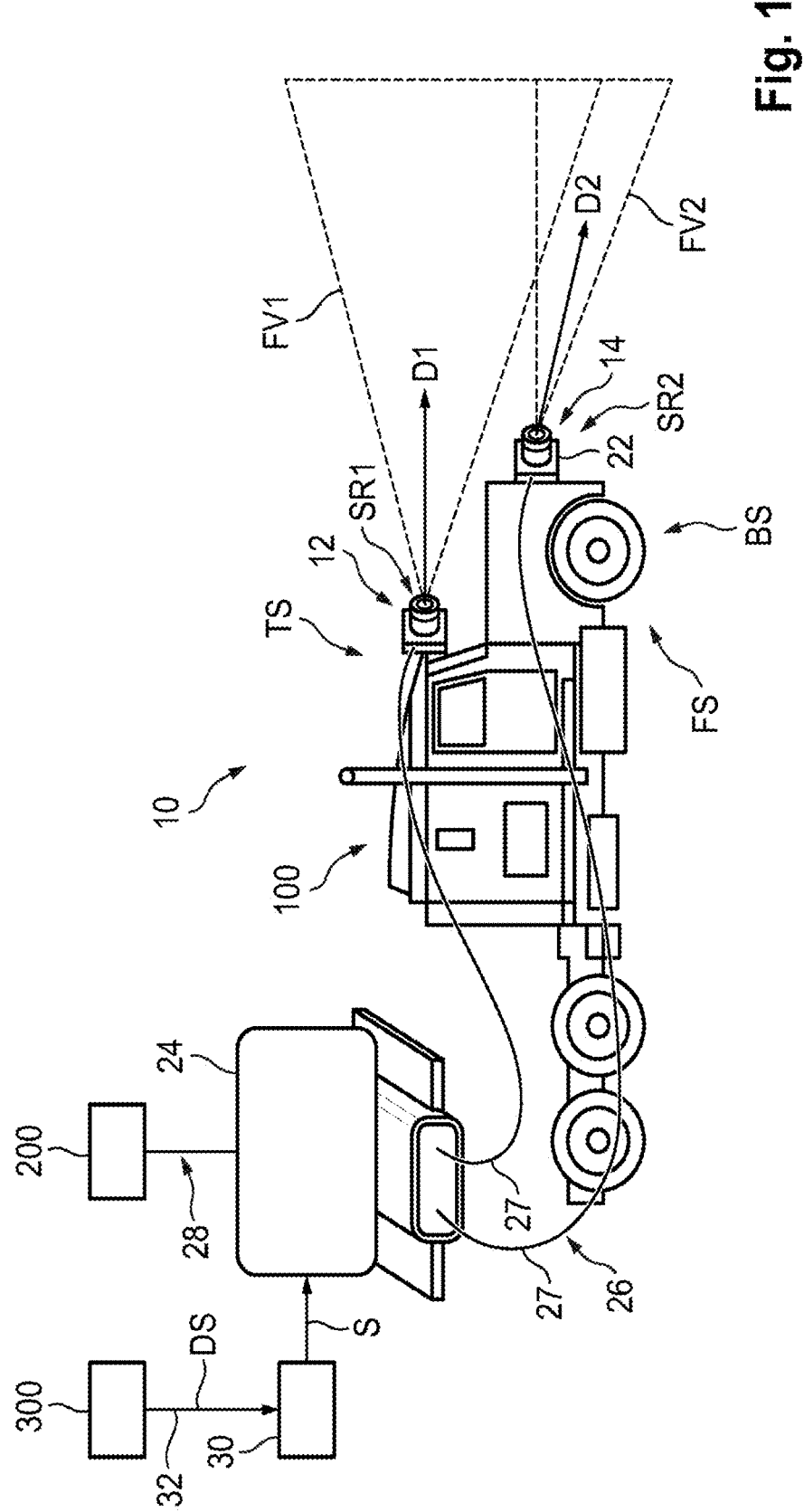

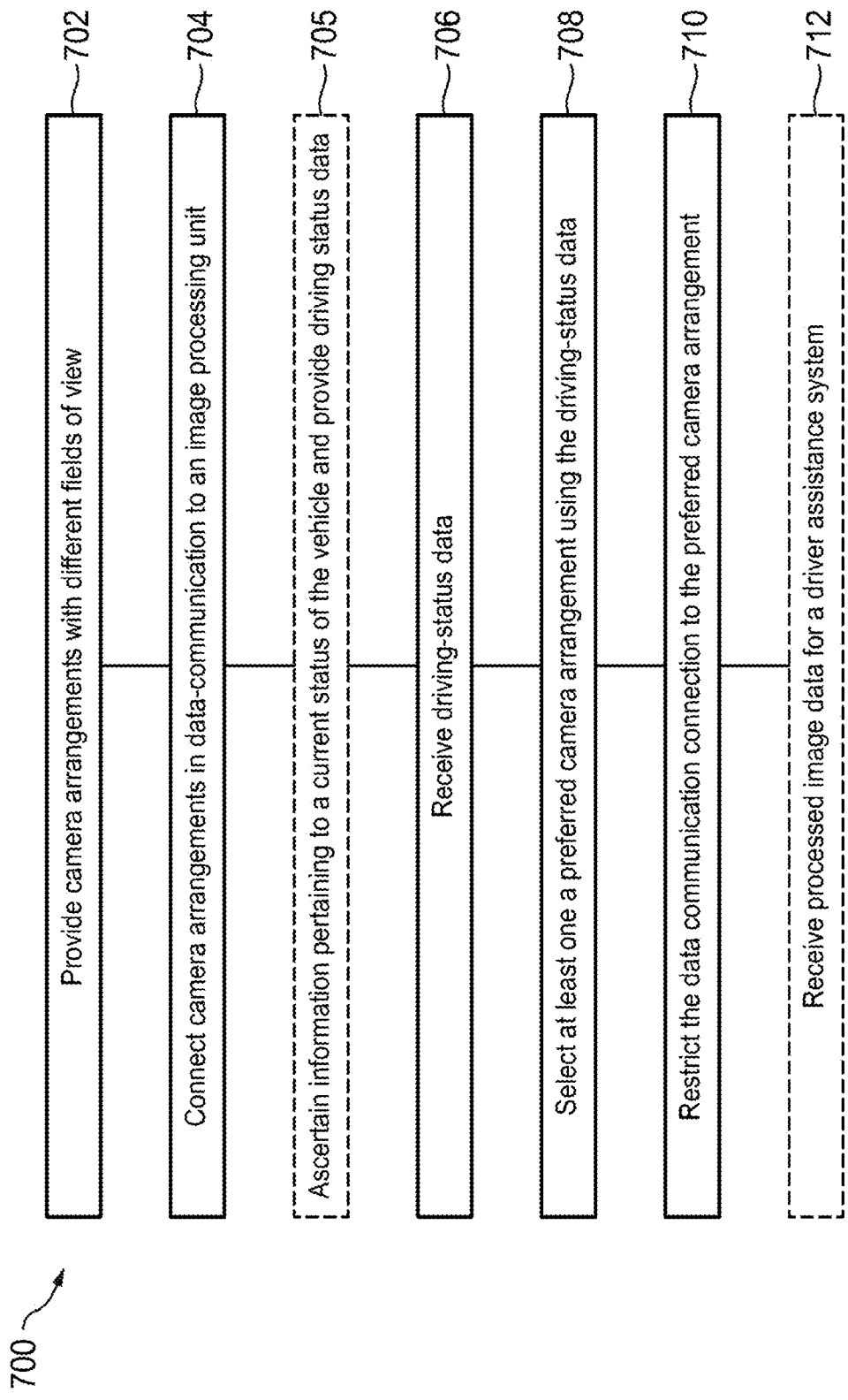

ADAPTIVE CAMERA SYSTEM FOR A VEHICLE AND VEHICLE COMPRISING THE ADAPTIVE CAMERA SYSTEM AND METHOD FOR OPERATING THE ADAPTIVE CAMERA SYSTEM

CROSS REFERENCE TO RELATED APPLICATIONS

This application is a U.S. National Phase application under 35 U.S.C. § 371 of International Application No. PCT/EP2021/083335, filed on Nov. 29, 2021. The International Application was published in English on Jun. 1, 2023 as WO 2023/094007 A1 under PCT Article 21(2).

FIELD

The present invention is directed to an adaptive camera system for a vehicle, to a vehicle comprising an adaptive camera system and the present invention is directed to a method for operating an adaptive camera system.

BACKGROUND

Document U.S. Pat. No. 9,656,608 B2 discloses a vehicular driver assist system suitable for use in a vehicle that includes a video processor module receiving and processing image data provided by a plurality of video sensors and sensor data provided by a plurality of non-video sensors. The video processor module communicates with other vehicle systems via a vehicle bus. The received image data may be processed at the video processor module to generate a synthesized image, which may be output from the video processor module for display by a single display Screen of a display device that is viewable by a driver of the vehicle.

Typically, in known camera systems comprising a plurality of video sensors or camera units, image data from all video sensors or camera units are provided simultaneously to the video processor module or image-processing unit for processing. This means that all cameras are on duty. The higher the number of camera units is, the more computing power is required for processing the provided image data and to output the analysis resulting from said processing. With a growing number of camera units installed, if the processing capacity of the image-processing unit is not increased, the imaging-processing unit will eventually overload.

SUMMARY

In an embodiment, the present disclosure provides an adaptive camera system for a vehicle, comprising a plurality of camera arrangements, wherein each camera arrangement comprises at least one camera unit, and wherein each camera arrangement is arranged on the vehicle such that each camera arrangement is configured to have respective different optical properties to cover a respective different field of view and/or to have a respective different spectral response. The plurality of camera arrangements are adapted to be connected in data-communication to an image processor that is configured to receive image data from the camera arrangement. The system further comprises a camera arrangement selector configured to receive driving-status data pertaining to an actual status of the vehicle. The camera arrangement selector is adapted to select from the plurality of camera arrangements, using the driving-status data, at least one preferred camera arrangement for being connected in data-communication to the image processor. A data-communication connection to the image processor is restricted to the at least one preferred camera arrangement for data-communication with the image processor.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 illustrates a schematic representation of a commercial vehicle comprising an adaptive camera system according to an embodiment of the invention;

FIG. 7 shows a flow diagram of an embodiment of a method for operating an adaptive camera system of a vehicle.

DETAILED DESCRIPTION

Figure 2B:
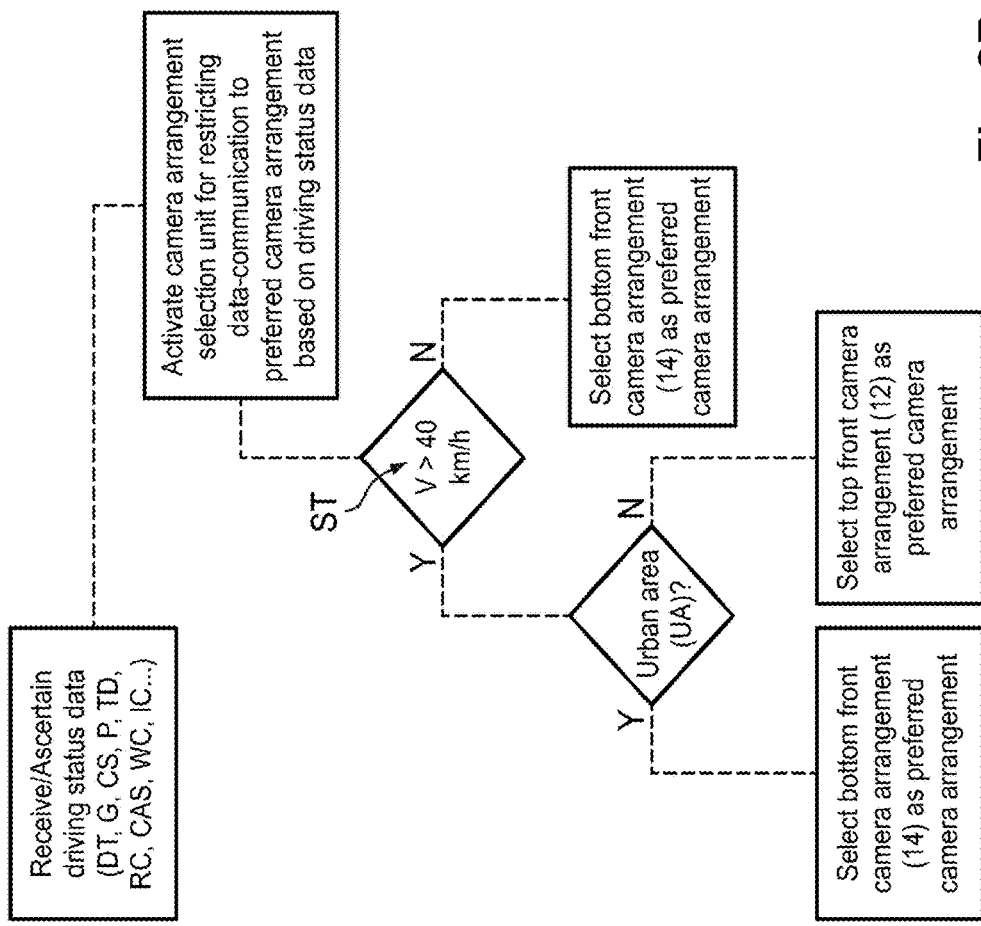
FIG. 2B illustrates a flow diagram of an exemplary first selection algorithm implemented by a camera arrangement selection unit of an adaptive camera system according to an embodiment of the invention shown in FIG. 1.

In an embodiment, the present invention provides a lean adaptive camera system for a vehicle that uses less computational resources.

A first aspect of the present invention is formed by an adaptive camera system for a vehicle. The adaptive camera system comprises a plurality of camera arrangements, wherein each camera arrangement comprises at least one camera unit. Each camera arrangement is arranged on the vehicle such that each camera arrangement is configured to have respective different optical properties. In particular, each camera arrangement is configured to cover a respective different field of view, for example wherein the respective field of view of any camera arrangement has a main view direction or a view width distinct from another main view direction and/or view width of other distinct field of view of any other camera arrangement. Alternatively, or additionally, some of the camera arrangement are configured to have a respective different spectral response. The spectral response is defined as the sensitivity of the camera unit to optical radiations of different wavelengths. In the adaptive camera system of the first aspect of the invention, the plurality of camera arrangements are adapted to be connected in data-communication to an image-processing unit that is configured to receive image data from the camera arrangements.

The adaptive camera system also comprises a camera arrangement selection unit that is configured to receive or ascertain driving-status data pertaining to an actual or current status of the vehicle. The camera arrangement selection unit is advantageously adapted to select from the plurality of camera arrangements, and using the driving-status data, at least one preferred camera arrangement for being connected in data-communication to the image-processing unit. In the adaptive camera system of the first aspect of the invention a data-communication connection to the image-processing unit is restricted to the at least one preferred at camera arrangement for data-communication with the image-processing unit, which reduces the risk of overloading the processing capacities of the image.

Thus, in the adaptive camera system of an embodiment of the invention, a plurality of camera arrangements is available but only image data from the preferred camera arrangement is processed. Each of the camera arrangements is arranged on the vehicle such that each covers a respective different field of view, either in terms of a respective main direction of the field of view or a respective width of the field of view. Additionally, or alternatively, the camera arrangements are configured to have a respective different spectral response, for instance by using wavelength dependent filters or different sensor technologies in the camera unit. In other words, every camera arrangement has a distinct set of optical properties. Which of the camera arrangements is, at any given moment, the preferred camera arrangement that to be connected in data-communication with the image-processing unit is selected by the camera arrangement selection unit using the received or ascertained driving-status data.

In the following, developments of the adaptive camera system of the first aspect of the invention will be described.

In a development, the camera arrangement selection unit is an integral part of the image processing unit, whereas in other developments the camera arrangement is a separate hardware unit in signal communication with the image processing unit. In yet other developments, the camera arrangement selection unit and the image processing unit are both units of an electronic control unit of a vehicle.

The connection in data communication between the camera arrangement and the image processing unit is, in a particular development, done via a wired data connection, for example via a communication bus. In another development, one or more of the camera arrangements are connected wirelessly to the image processing unit. Additionally or alternatively, the camera arrangements can be connected in data communication to the image processing unit via an intermediate communication device.

In a development the image processing unit is configured to receive image data restricted to image data from the at least one preferred at camera arrangement, and/or the data-communication connection is restricted to the at least one preferred camera arrangement as being configured to send image data to the image processing unit. In a particular development, a single data-connection between the all camera arrangements, or a subset thereof, and the image-processing unit is shared by the camera arrangements, whereas in an alternative embodiment, every camera arrangement, or a subset thereof, has respective a point-to-point connection with the image-processing unit.

In another development, the preferred camera arrangement is selected for being connected in data-communication based on an evaluation of the driving-status data, in particular such that a single camera arrangement is selected as preferred camera arrangement. Preferably, the selection of the preferred camera arrangement is performed by the camera arrangement selection unit using the driving-status data and a predetermined selection-algorithm, in particular, a selection algorithm that associates driving-status data to a corresponding subset of preferred camera arrangements. Based on the driving-status data and the selection algorithm, the camera arrangement selection unit is advantageously configured to provide to the image processing unit a select-signal indicative of the subset of preferred camera arrangements. The evaluation of the driving status data is particularly performed in order to determine which of the fields of view covered by the respective camera arrangements actually offers the most relevant information, in particular in terms of safety or risk avoidance, given the current driving status.

In a further development wherein the image processing unit is configured to receive the select-signal and to process image data received only from the subset of preferred camera arrangements indicated by the select signal.

Thus, in a particular development, and depending on the current driving-status data a subset of preferred camera arrangements are selected from the plurality of camera arrangements for being connected in data-communication to the processing unit.

In yet another embodiment, which can be used in combination with any of the technical features discussed herein, the processing unit is adapted for evaluating processed data from the image data and/or providing processed data to a driver assistance system, wherein the image data are restricted to that provided by the at least one preferred at camera arrangement only.

In particular, in a development, the driving-status data is indicative of a direction of travel of the vehicle (e.g. forward direction, backward direction, turning left, turning right, uphill, downhill, etc.), a current gear used by the vehicle (forward gear, reverse gear), a current speed of the vehicle, a position of the vehicle, a current time of driving, for instance indicative of whether it is night time or day time, environmental data, for instance pertaining to current weather conditions, illumination conditions, or current road congestion, an state of the respective camera arrangement, for instance indicative of whether the camera unit is blocked, for example by dirt on the camera unit, or any combination thereof. The driving-status data is in a particular development received in suitable form by the camera-arrangement selection unit. Additionally, or alternative, the driving-status data, or part thereof, is ascertained by the camera-arrangement selection unit. The driving status can be determined by sensor elements in the vehicle. Alternatively or additionally, the driving status can be determined by an electronic control unit of the vehicle. The position of the vehicle can for instance be determined by the use of geolocation or geopositioning tools, including, but not limited to, GPS.

In a particular development, each camera arrangement comprises one camera unit. In an alternative embodiment, one or more of the camera arrangements comprise two or more camera units, which enables, for example the provision of depth information in a particular field of view direction.

In a development, that can also include any of the technical features discussed above, a first camera arrangement is arranged on a top section of a front side of the vehicle and a second camera arrangement is arranged on a bottom section of the front side of the vehicle. Additionally, or alternatively, a third camera arrangement is arranged on a rear side of the vehicle. Additionally, or alternatively, a fourth camera arrangement is arranged on a left side of the vehicle and/or a fifth camera arrangement is arranged on a right side of the vehicle. It is preferred that the fields of view of the first and second camera arrangements are substantially directed in the forward direction of travel, the field of view of the third camera arrangement is substantially directed in the backward direction of travel, and the fields of view of the fourth and fifth camera arrangements are substantially directed perpendicular to the direction of travel, i.e., to the left and to the right side of the forward direction of travel. In another development, additional or alternative camera arrangements are positioned on the vehicle, each having a different field of view.

In a development including at least the first and the second camera arrangement as discussed above, the camera arrangement selection unit advantageously is configured to select, as preferred camera arrangement, the second camera arrangement, upon determining, using the driving-status data, that the speed of the vehicle is lower than a predetermined speed threshold amount or upon determining, using the driving-status data, that the vehicle is currently located in an urban area; and otherwise to select the first camera arrangement as preferred camera arrangement. Further preferably, when the driving-status data is indicative of a speed lower than the threshold amount, but at the same time indicative of a congested traffic situation or a traffic jam, the camera arrangement section unit is configured to select the first camera arrangement (upper front camera arrangement). Additionally, or alternatively, the camera arrangement selection unit is configured to change its current selection upon determining, using the driving-status data indicative of a current state of the camera arrangement (e.g. whether it is blocked by dirt), that the currently selected camera arrangement is blocked.

In another development, two camera arrangements have fields of view with the same main directions, but different view widths, i.e. one camera arrangement has a narrow field of view is selected when far-range observations are required (for instance when driving at high speed or on a highway and the other camera arrangement with a larger field of view is selected when driving at lower speeds.

Additionally, or alternatively, camera arrangements with substantially similar main view directions and view widths have different spectral response or spectral sensitivity. For instance a first camera arrangement includes a camera unit with an RGB sensor, whereas a second camera arrangement includes a camera unit with an infrared sensor. The selection of the camera arrangement by the camera arrangement selection unit is performed, for instance, based on driving status data indicative of a current time of day (e.g. daytime or nighttime) or current illumination conditions.

In a development, that further includes the third camera arrangement, the camera arrangement selection unit is advantageously configured to select, as preferred camera arrangement, the third camera arrangement upon determining, using the driving-status data, that the vehicle is travelling backwards or upon determining that a reverse gear is in use.

In a development that additionally or alternatively includes the fourth and the fifth camera arrangements, the camera arrangement selection unit is advantageously configured to select, as preferred camera arrangement, or to add to a preselected subset of preferred camera arrangement, the fourth camera arrangement upon determining, using the driving-status data, that the vehicle is turning to the left and to select, as preferred camera arrangement, or to add to a preselected subset of preferred camera arrangement, the fifth camera arrangement upon determining, using the driving-status data, that the vehicle is turning to the right.

A second aspect of the present invention is formed by a vehicle, in particular a commercial vehicle or an automobile, that comprises an adaptive camera system in accordance with the first aspect or any one of its developments and a driving-status determination unit that is advantageously configured to ascertain information pertaining a current status of the vehicle and to provide to the adaptive camera system the driving-status data indicative thereof. The disclosed vehicle thus shares the advantages of the adaptive camera system of the first aspect.

In a development of the vehicle of the second aspect, the driving-status determination unit includes one or more sensing unit for determining the current status of the vehicle. Additionally, or alternatively, the driving-status determination unit can be connected to external sensing units or to an electronic control unit for ascertaining the required status of the vehicle.

In another development, the vehicle further comprises a driver assistance system configured to receive the processes image data from the selected camera arrangements.

According to a third aspect of the present invention, a method for operating an adaptive camera system of a vehicle is described. The method comprises providing a plurality of camera arrangements, wherein each camera arrangement comprises at least one camera unit, and wherein each camera arrangement is arranged on the vehicle such that each camera arrangement is configured to have respective different optical properties, in particular, to cover a respective different field of view and/or to have a respective different spectral response. In particular, the respective field of view of a first camera arrangement has a main view direction and/or view width distinct from another main view direction or view width of another distinct field of view of another, second camera arrangement;

connecting the plurality of camera arrangements in data-communication to a processing unit configured to receive image data from the camera receiving driving-status data pertaining to an actual status of the vehicle selecting from the plurality of camera arrangements, using the driving-status data, at least one preferred camera arrangement for being connected in data-communication to the processing unit, and restricting a data-communication connection to the processing unit to the at least one preferred at camera arrangement for data-communication with the processing unit.

The method of the third aspect thus shares the advantages of the adaptive camera system of the first aspect of the invention.

In a development, the method of the third aspect further comprises:

ascertaining information pertaining a current status of the vehicle and to providing the driving-status data indicative thereof.

In yet another development, the method further comprises receiving, at a driver assistance system, the processes image data from the selected camera arrangements.

It shall be understood that the adaptive camera system of embodiments of the present disclosure, the vehicle of embodiments of the present disclosure, and the method of embodiments of the present disclosure have similar and/or identical preferred embodiments.

It shall be understood that embodiments of the present invention can also be any combination of the above embodiments.

These and other aspects of embodiments of the invention will be apparent from and elucidated with reference to the embodiments described hereinafter.

The embodiments of the invention are described in the following on the basis of the drawings in comparison with the state of the art, which is also partly illustrated. The latter is not necessarily intended to represent the embodiments to scale. Drawings are, where useful for explanation, shown in schematized and/or slightly distorted form. With regards to additions to the lessons immediately recognizable from the drawings, reference is made to the relevant state of the art. It should be borne in mind that numerous modifications and changes can be made to the form and detail of an embodiment without deviating from the general idea of the present disclosure. The features of the present disclosure disclosed in the description, in the drawings and anywhere else in the present disclosure can be implemented either individually or in any combination.

In addition, all combinations of at least two of the features disclosed in the description, drawings and/or elsewhere in the present disclosure fall within the scope of the present disclosure. For specified design ranges, values within the specified limits are also disclosed as limit values and thus arbitrarily applicable.

FIG. 1 shows a schematic representation of a commercial vehicle 100 that comprises an adaptive camera system 10. The adaptive camera system 10 of FIG. 1 includes two camera arrangements 12, 14, wherein each of the two camera arrangement comprises camera unit 22. Each of the two camera arrangements 12, 14 is arranged on the vehicle 100 such that each camera arrangement 12, 14 is configured to cover a respective field of view FV1, FV2, in particular wherein the respective field of view FV1, of a first camera arrangement 12 has a main view direction D1 distinct from another main view direction D2 of another distinct field of view FV2 of another, second camera arrangement 14. Camera arrangement 12 is a top front camera arrangement and camera arrangement 14 is a bottom front camera arrangement. The camera units 22 of the camera arrangements have a respective spectral response SR1, and SR2

In the adaptive camera system 10, the plurality of camera arrangements 12, 14, are adapted to be connected in data-communication to a processing unit 24 that is configured to receive image data 26 from the camera arrangements 12, 14. The adaptive camera system 10, also comprises a camera arrangement selection unit 30 that configured to receive driving-status data DS pertaining to an actual status of the vehicle. The camera arrangement selection unit 30 is advantageously adapted to select from the plurality of camera arrangements 12, 14, and using the driving-status data DS, at least one preferred camera arrangement for being connected in data-communication to the processing unit 24. Thus a data-communication connection 27 to the processing unit 24 is restricted to the at least one preferred at camera arrangement for data-communication with the processing unit 24.

In a particular embodiment, the camera arrangement selection unit 30 is an integral part of the processing unit 24. In particular, a processing unit 24 having several camera-interfaces, for instance one for each camera arrangement 12, 14, or for each camera unit 22 is advantageously configured to receive the driving-status data (DS) via a dedicated interface, such as a CAN interface connected to a CAN bus. In the embodiment shown in FIG. 1, the camera arrangement selection unit 30 is configured to receive the driving status data via a dedicated interface, for instance a CAN bus 32 and to provide a select signal S indicative thereof to the processing unit 24.

Exemplarily, the camera arrangement selection unit 30 uses the received or ascertained driving-status data DS and a predetermined selection-algorithm associating driving-status data DS to a corresponding preferred camera arrangement, to provide to the image processing unit a select-signal S indicative of the subset of preferred camera arrangements. This will be discussed below with reference to FIG. 2B. In embodiments wherein the camera arrangement selection unit 30 is an integral part of the processing unit, the select-signal is an internal signal.

The driving-status data DS that is received or ascertained by the camera arrangement selection unit is, for instance, indicative of a direction of travel of the vehicle, e.g. forward moving vehicle, a backward moving vehicle, or a right or left turning vehicle. Additionally, or alternatively, the driving-status data is indicative of a current gear used by the vehicle, a current speed of the vehicle, a position of the vehicle, current time of driving, a current state of road congestion or traffic, an state of the respective camera arrangement indicative of whether the camera unit 22 is currently blocked, for example by dirt, or any combination thereof.

In the vehicle 100 of FIG. 1, the adaptive camera system 10 includes a first camera arrangement 12, which is arranged on a top section TS of a front side FS of the vehicle as shown in the figure, and a second camera arrangement 14, which is arranged on a bottom section BS of the front side FS of the vehicle 100, also as shown in the figure. The main direction D1 of the field of view FV1 of camera arrangement 12 is directed to a point on the road further away from the vehicle than that of the main direction D2 of the field of view FV2 of camera arrangement 14. Thus, field of view FV1 can be regarded as a far field of view and field of view FV2 can be regarded as a near field of view. The camera arrangement 12 with the far field of view FV1 is arranged on the top section of the front side to avoid shadow zones that are present when the camera is arranged in the windshield due to the nozzle of the vehicle.

The adaptive camera 10 uses the driving-status data DS and a predetermined selection-algorithm associating driving-status data to a corresponding subset of one or more preferred camera arrangements, to provide to the image processing unit a select-signal S indicative of the subset of preferred camera arrangements. Preferably, in the adaptive camera system 10' the image processing unit 24 is adapted for evaluating processed data 28 from the image data 26 and/or providing processed data 28 to a driver assistance system 200. Also preferably, the vehicle 100 comprises a driving-status determination unit 300 that is configured to ascertain information pertaining a current status of the vehicle 100 and to provide to the adaptive camera system 10 the driving-status data DS indicative thereof.

Figure 2A:
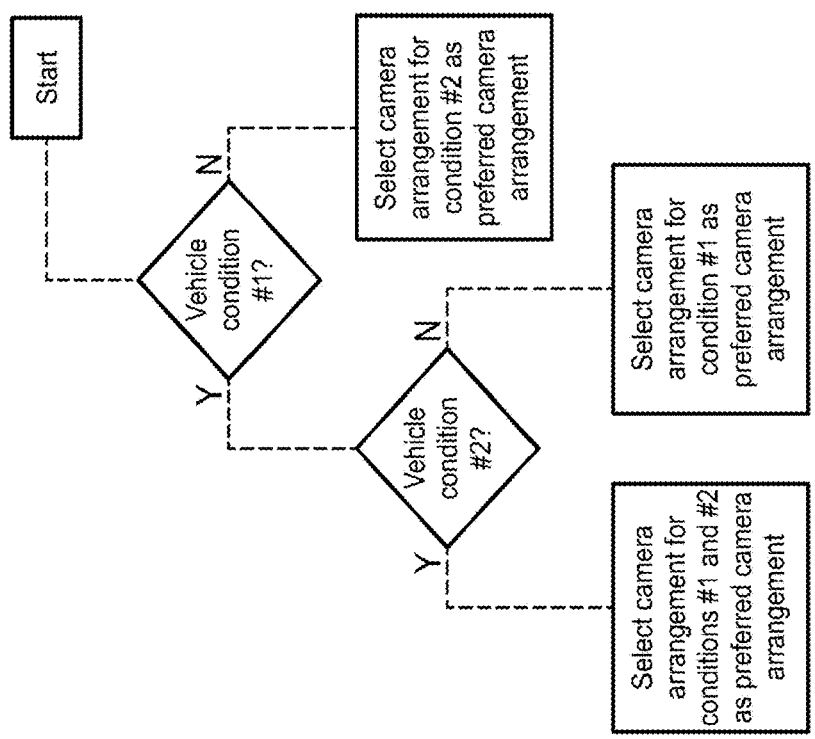
FIG. 2A illustrates a flow diagram of an exemplary selection algorithm implemented by a camera arrangement selection unit of an adaptive camera system according to an embodiment of the invention.

FIG. 2A shows a flow diagram of an exemplary selection algorithm implemented by a camera arrangement selection unit of an adaptive camera system according to an embodiment of the invention. Using the received or ascertained driving-status data DS, the camera arrangement selection unit determines whether a first vehicle condition is fulfilled. If the first vehicle condition is not fulfilled, the camera arrangement selection unit determines whether a second vehicle condition is fulfilled. According to the flow diagram of FIG. 2A, if the first vehicle condition is not fulfilled, the algorithm indicates that the camera arrangement associated to the second vehicle condition is to be selected as preferred camera arrangement. If however, the first vehicle condition is fulfilled but the second vehicle condition is not fulfilled, the algorithm indicates that the camera arrangement associated to the first vehicle condition is to be selected as preferred camera arrangement. If both vehicle conditions are fulfilled, the algorithm indicates that the camera arrangement associated to the first vehicle condition and the camera arrangement associated to the second vehicle condition are to be selected as preferred camera arrangements. This is a non-limiting example, and algorithm including another number of conditions and different camera arrangements associated to a particular condition or set of conditions are also possible, as the person skilled in the art can recognize.

FIG. 2B shows a flow diagram of an exemplary first selection algorithm implemented by a camera arrangement selection unit of an adaptive camera system according to an embodiment of the invention, in particular that shown in FIG. 1. In this particular example, the ascertained or received driving-status data is indicative of a current speed or velocity of the vehicle, for example received from an electronic control unit of the vehicle that is connected to a tachometer, and also of a current location of the vehicle, in particular of whether the vehicle is in an urban area. This can be for instance ascertained using geolocation information, for example from a GPS system. The camera arrangement selection unit is activated for restricting data communication to one preferred camera arrangement based on the driving-status data. According to the flow diagram of FIG. 2B, if the first vehicle condition, i.e. if the current speed is not above 40 km/h, is not fulfilled, the algorithm indicates that the bottom front camera arrangement 14, i.e. that with the near field view is to be selected as preferred camera arrangement. If however, the current speed is higher than 40 km/h and the vehicle is not currently in an urban area, the algorithm indicates that the top front camera arrangement 12, i.e. that with the far field view is to be selected as preferred camera arrangement. If both vehicle conditions are fulfilled, the algorithm in this particular example indicates that the bottom front camera arrangement 14 having the near field of view is to be selected as preferred camera arrangement. This is a non-limiting example, and the threshold velocity of 40 km/h is used only as an example.

According to FIG. 1 and FIG. 2B, the adaptive camera system 10 comprises an image processing unit 24 configured to process image data from a single camera arrangement 12, 14, that are positioned on the vehicle so as to have different fields of view FV1, and FV2, i.e., camera arrangement 12 positioned in the upper part of the windshield while the camera arrangement 14 is positioned in the upper part of the nozzle of the vehicle 100, and/or camera units with different spectral responses SR1, SR2. The camera arrangement selection unit operates 30 according to a predetermined selection algorithm that makes use of driving-status data DS of the vehicle such as the direction of travel DT, current gear G, current speed SP and the current position or location P (e.g. through GPS positioning), current time od driving (e.g. to determine whether it is daytime or nighttime), a current state of traffic or road congestion RC, an state of the camera arrangement CAS, for example to determine whether a camera unit is dirty or otherwise blocked, weather conditions, or illumination conditions in the environment, to select which camera is arrangement is going to be selected for image data processing at the image processing unit 24. As result, it is possible to optimize the camera system efficiency without the need to increase the processing capacity and consequently the costs of the system. For example, according to FIG. 2B. when vehicle 100 is moving at higher speeds (e.g.: above 40 km/h), or outside an urban area UA, camera arrangement 12, located on the top section of the vehicle 100 is selected in order to provide to the image processing unit 24 image data with a larger field of view FV1. When the vehicle is moving at lower speed (below a speed threshold amount ST of e.g., 40 km/h) the camera arrangement 14 located at the lower section of the front part of the vehicle is selected for providing better visualization in the vicinity of the vehicle, which is crucial for detecting, for example, vulnerable road users. In another embodiment, the camera arrangement selection unit 30 can also determine, based on driving status data DS indicative of a current road congestion RC, whether the selected camera arrangement should be changed from the second camera arrangement 14 located at a lower position (see FIG. 1), and thus susceptible of having its field of view FV2 blocked by the closely located vehicles, to the first camera arrangement 12, located at a higher position, and therefore with a field of view FV1 that offer more chances of providing relevant image data.

Figure 3:
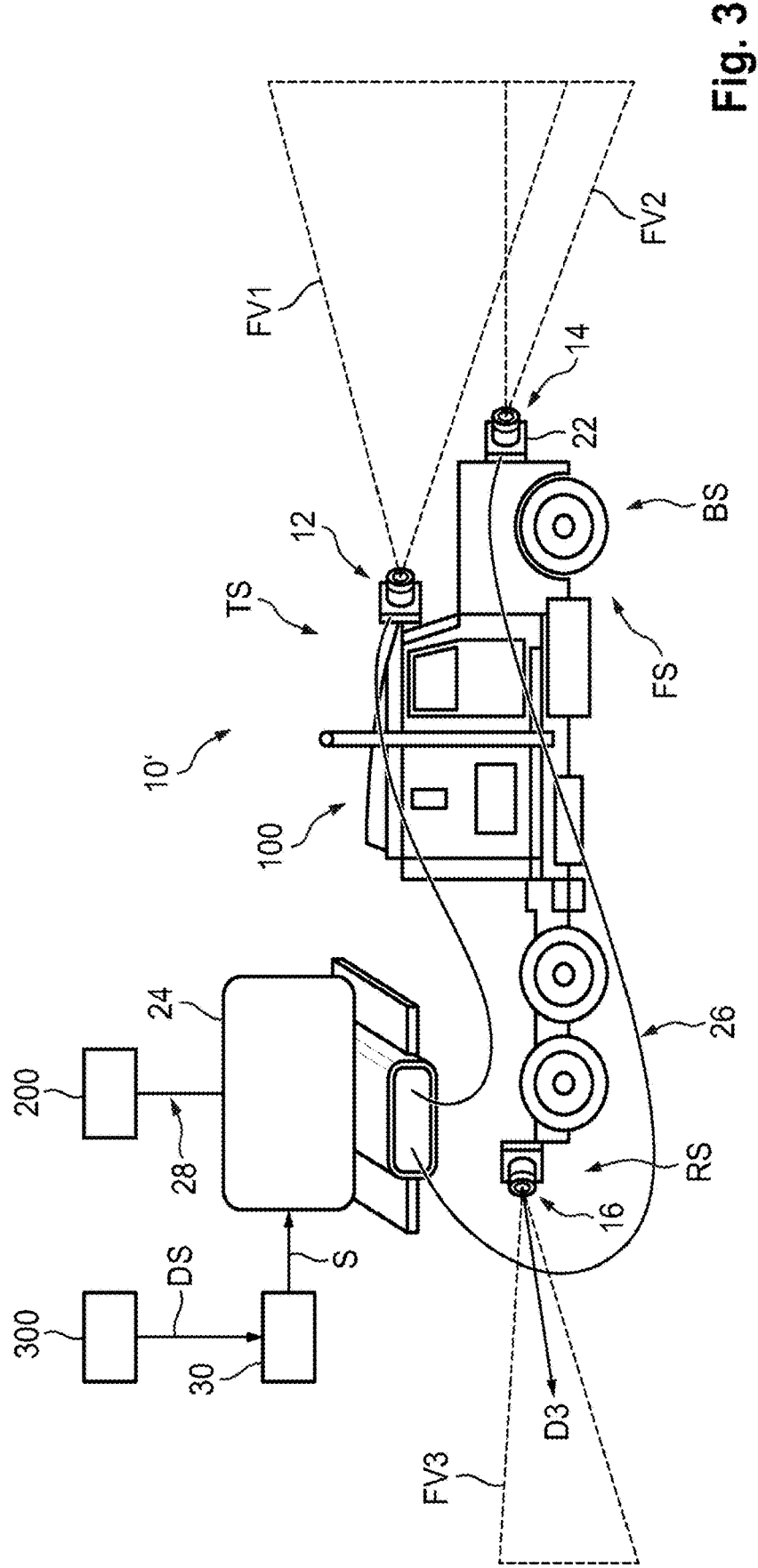
FIG. 3 illustrates a schematic representation of a second embodiment a commercial vehicle comprising an adaptive camera system according to an embodiment of the invention.

FIG. 3 shows a schematic representation of a second embodiment a commercial vehicle 100 comprising an adaptive camera 10' system according to an embodiment of the invention. Those technical features having the same or similar characteristics and/or purposes will be referred to using the same numerals as in the vehicle 100 of FIG. 1 and the current discussion will be focused on the features distinguishing the camera system 10' of FIG. 3 from the camera system 10 of FIG. 1.

The adaptive camera system 10' of FIG. 3 further includes a third camera arrangement 16, referred to as back or rear camera arrangement, that is arranged on a rear side RS of the vehicle 100 and that has a field of view FV3 that has a main view direction D3 in the backward direction of travel of the vehicle, as indicated in FIG. 3.

Figure 4:
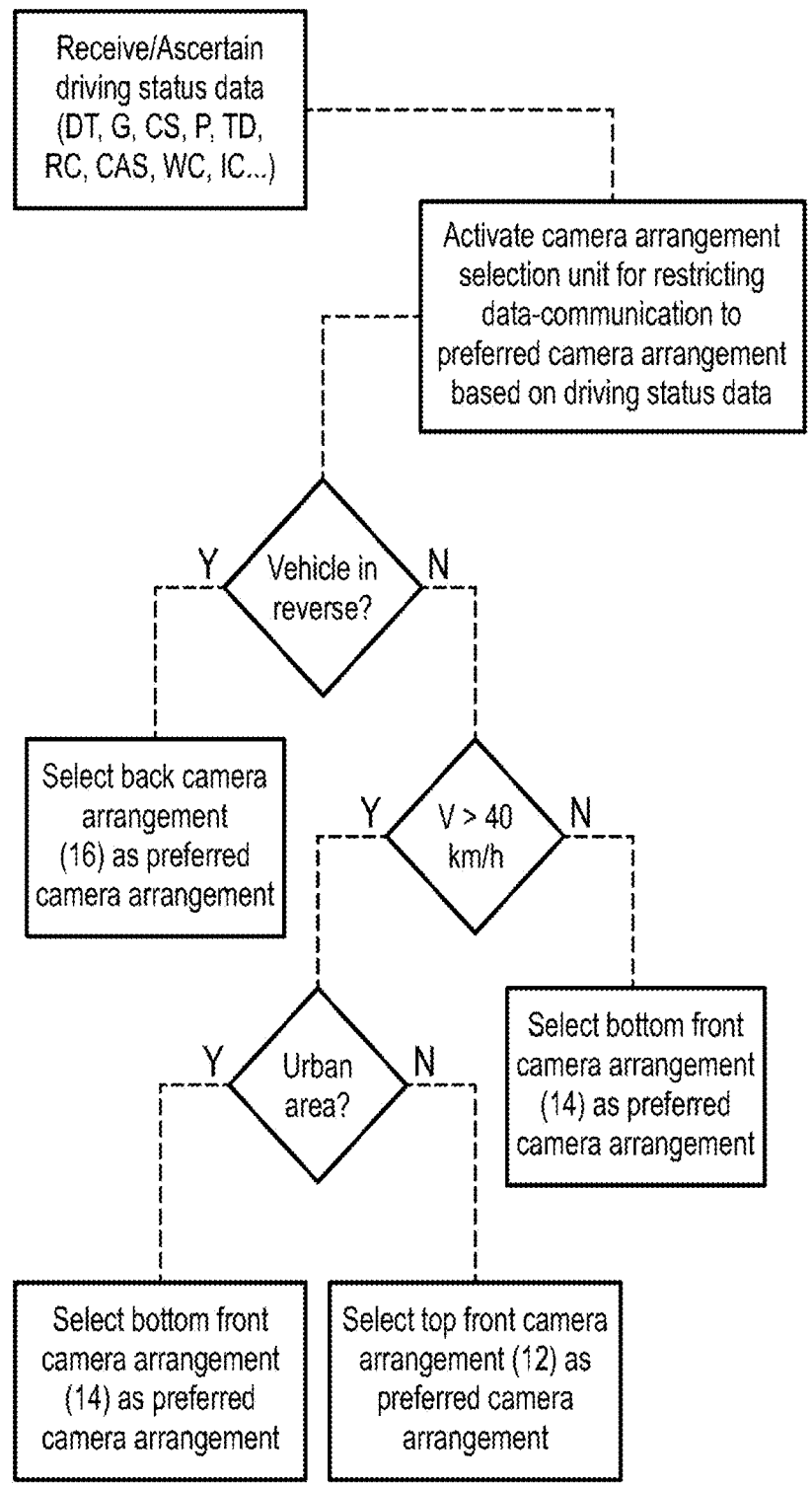
FIG. 4 illustrates a flow diagram of a second selection algorithm implemented by a camera arrangement selection unit of an adaptive camera system according to an embodiment of the invention shown in FIG. 3.

FIG. 4 shows a flow diagram of a second selection algorithm implemented by a camera arrangement selection unit of an adaptive camera system according to an embodiment of the invention, in particular that shown in FIG. 3. First, after receiving or ascertaining relevant driving-status data (see discussion of FIG. 2B above). the camera arrangement selection unit 30 is activated for restricting data communication with the image processing unit 24 to preferred camera arrangements, and determines, using the driving-status data DS, whether the vehicle is traveling in reverse, or whether, for example, the reverse gear is engaged. If this is currently the case, the camera arrangement selection unit selects back or rear camera arrangement 16 as selected camera arrangement for being connected in data-communication to the image processing unit 24. If not, the camera arrangement selection unit 30 follows the decision algorithm explained with reference to FIG. 2.

Figure 5:
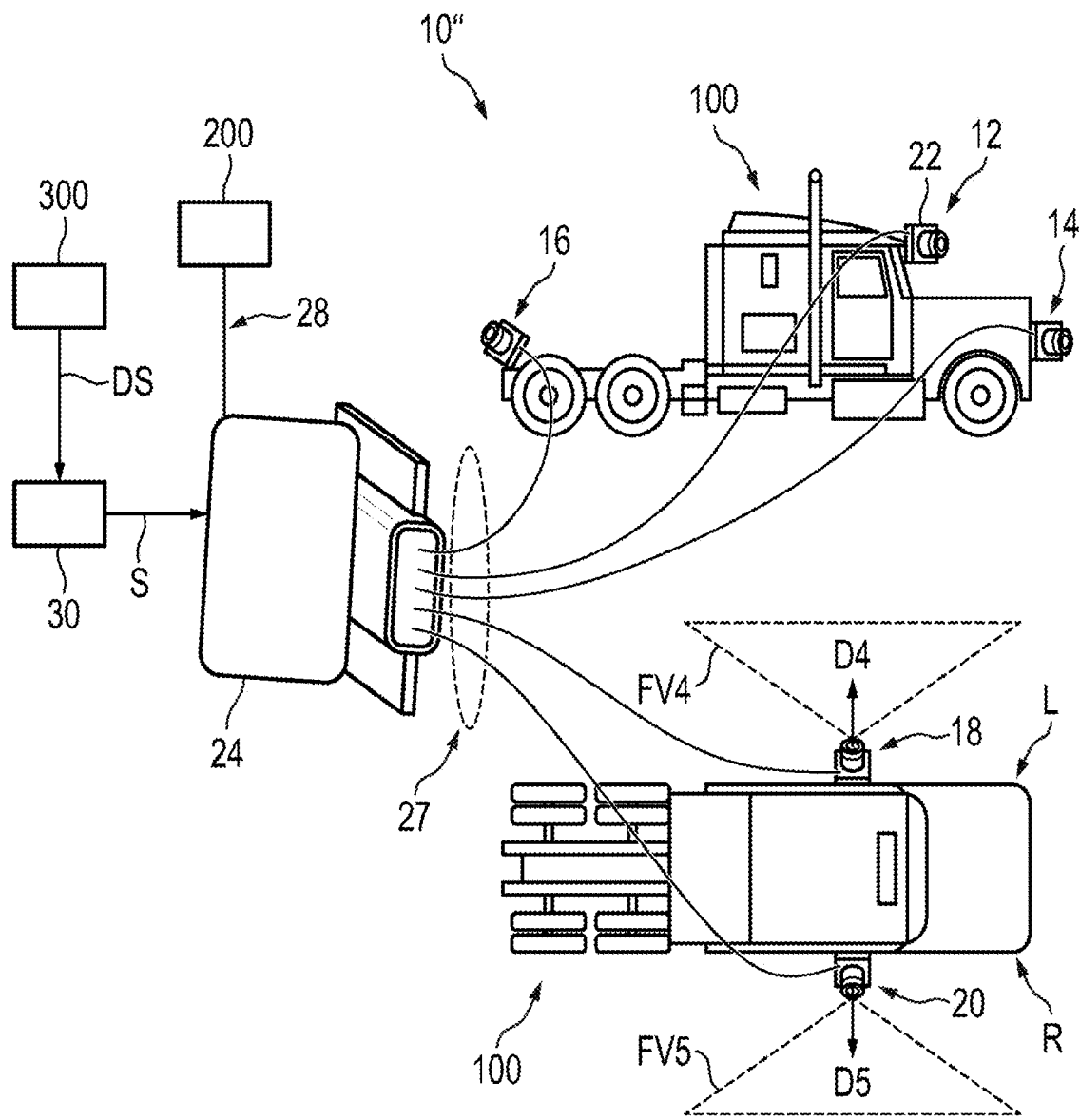
FIG. 5 illustrates a schematic representation of a third embodiment a commercial vehicle comprising an adaptive camera system according to an embodiment of the invention.

FIG. 5 shows a schematic representation of a third embodiment a commercial vehicle comprising an adaptive camera system according to an embodiment of the invention. Those technical features having the same or similar characteristics and/or purposes will be referred to using the same numerals as in the vehicle 100 of FIGS. 1 and 3, and the current discussion will be focused on the features distinguishing the camera system 10" of FIG. 5 from the camera system 10 and 10' of FIG. 1 and FIG. 3 respectively.

FIG. 5 top part shows a side view of a commercial vehicle 100, where camera arrangements 12, 14 and 16 are visible. In the bottom part, FIG. 5 shows a top view of the same vehicle 100 showing two further camera arrangements, left camera arrangement 18 and a right camera arrangement 20. The fourth camera arrangement, left camera arrangement 18, is arranged on a left side L of the vehicle 100 and the fifth camera arrangement, right camera arrangement 20, is arranged on a right side R of the vehicle 100. The fourth and the fifth camera arrangements 18, 20 have a respective field of view FV4 and FV5, with a respective view direction D4 and D5.

Figure 6:
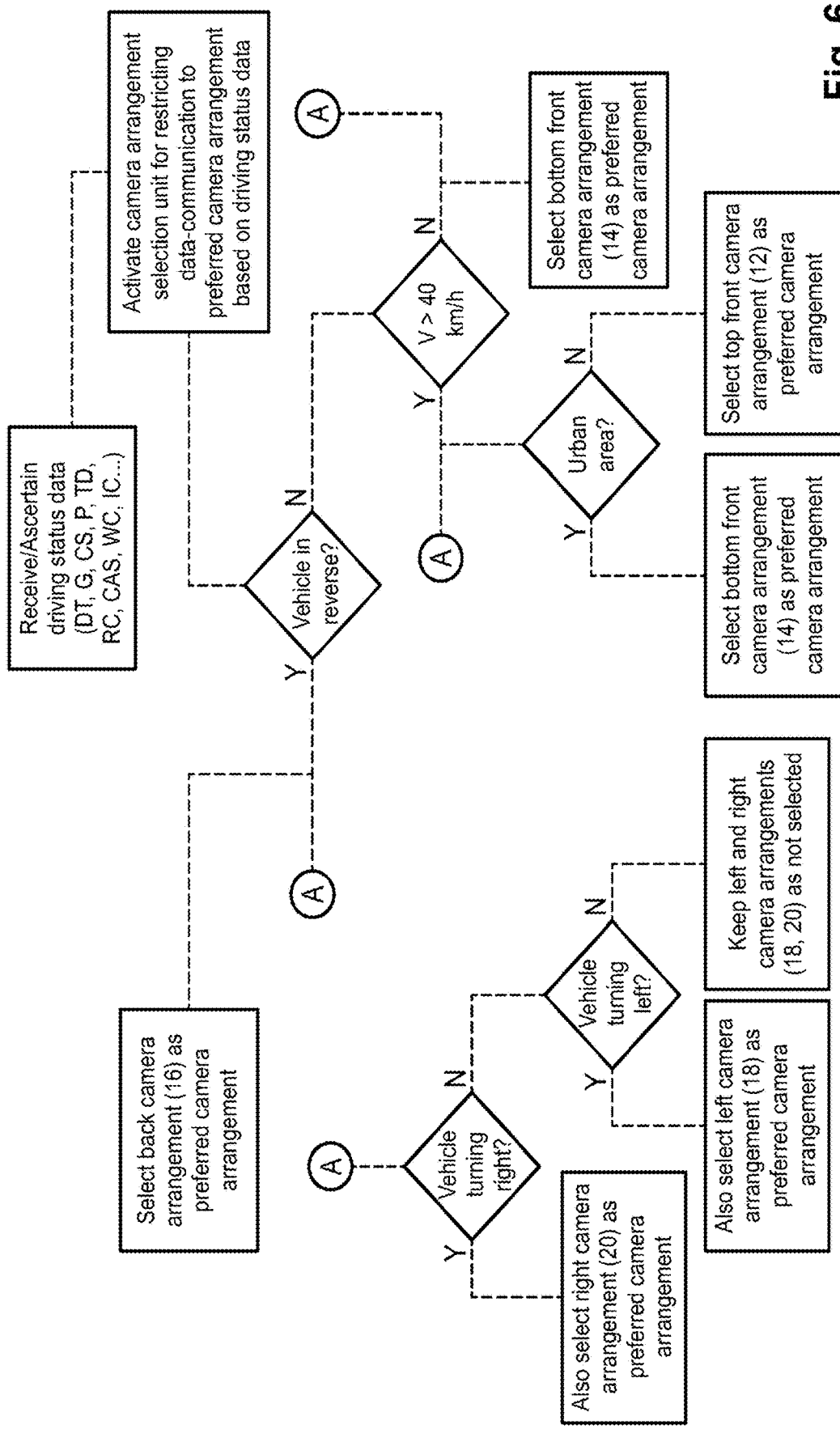
FIG. 6 illustrates a flow diagram of a third selection algorithm implemented by a camera arrangement selection unit of an adaptive camera system according to an embodiment of the invention shown in FIG. 5.

FIG. 6 shows a flow diagram of a third exemplary selection algorithm implemented by a camera arrangement selection unit of an adaptive camera system according to an embodiment of the invention, in particular that shown in FIG. 3. First, as in the example shown in FIG. 4, after receiving or ascertaining relevant driving-status data (see discussion of FIG. 2B above), the camera arrangement selection unit 30, after being activated for restricting the data-communication to the selected preferred camera arrangements determines, using the driving-status data DS, whether the vehicle is traveling in reverse, or whether, for example, the reverse gear is engaged. If this is currently the case, the camera arrangement selection unit selects rear camera arrangement 16 for being connected in data-communication to the image processing unit 24, and the jumps to point A of the flow diagram, where a possible turning direction of the vehicle is determined. If not in reverse, the camera arrangement selection unit 30 follows the decision algorithm explained with reference to FIG. 2, with a jump to point A after determining whether or not the current speed is above or below the speed threshold amount ST, e.g., 40 km/h. At point A, the decision algorithm is configured to determine whether the vehicle is currently turning and upon determining that the vehicle is turning, to further select one of the fourth and fifth camera arrangements as a camera arrangements belonging to the subset of preferred camera arrangements, in dependence on the direction of turn.

This enables the inclusion of more powerful image processing involving more complex environments. The image processing unit of the adaptive 24 camera system 10" has the capacity of processing image data obtained from two camera arrangements simultaneously and is connected to five cameras arrangements that are located, respectively, on the upper part of the windshield (camera arrangement 12), the upper part of the nozzle of the vehicle (camera arrangement 14), on the back of the vehicle (camera arrangement 16), one camera arrangement 18 on the left side of the vehicle and one camera arrangement 20 on the right side of the vehicle. In this particular embodiment, the selection algorithm uses driving-status data indicative of a vehicle direction, vehicle speed, and location, particularly via GPS data and associates based on pre-defined parameters which camera arrangement or pairs of camera arrangements should be selected. For example, when moving in an urban perimeter in low speed the camera arrangement 14 is selected, together with the left or right camera arrangement 18, 20 when the vehicle is turning left or right. In this embodiment the image processing unit 24 is connected to 5 camera arrangements, but processes image data of either one or at the most two camera arrangements simultaneously.

FIG. 7 shows a flow diagram of an embodiment of a method 700 for operating an adaptive camera system 10 of a vehicle 100. The method comprises, in a step 702, providing a plurality of camera arrangements, wherein each camera arrangement comprises at least one camera unit, and wherein each camera arrangement is arranged on the vehicle such that each camera arrangement is configured to have respective different optical properties, such as a respective different field of view, in particular wherein the respective field of view of a first camera arrangement has a main view direction distinct from another main view direction of another distinct field of view of another, second camera arrangement and/or respective different spectral responses. Further, the method comprises, in a step 704, connecting the plurality of camera arrangements in data-communication to a processing unit configured to receive image data from the camera. Further, the method 700 comprises, in a step 706, receiving driving-status data DS pertaining to an actual status of the vehicle and selecting, in a step 708, from the plurality of camera arrangements, and using the driving-status data, at least one preferred camera arrangement for being connected in data-communication to the processing unit. The method 700 also comprises, in a step 710, restricting a data-communication connection 27 to the image processing unit to the at least one preferred at camera arrangement for data-communication with the processing unit.

In a particular embodiment, the method 700 additionally comprises, in a step 705, ascertaining information pertaining a current status of the vehicle to providing the driving-status data indicative thereof.

In another embodiment, the method 700, additionally or alternatively comprises, in a step 712, receiving, at a driver assistance system, the processed image data from the selected camera arrangements.

In summary, the present disclosure is directed to an adaptive camera system for a vehicle, that comprises a plurality of camera arrangements, each is arranged on the vehicle such that each camera arrangement is configured to have respective different optical properties, such as a respective field of view, or spectral response, and adapted to be connected in data-communication to an image processing unit that is configured to receive image data therefrom. A camera arrangement selection unit is configured to receive driving-status data pertaining to an actual status of the vehicle and adapted to select, using the driving-status data, at least one preferred camera arrangement for being connected in data-communication to the image processing unit, wherein a data-communication connection to the image processing unit is restricted to the at least one preferred at camera arrangement for data-communication with the image processing unit.

Other variations to the disclosed embodiments can be understood and effected by those skilled in the art in practicing the disclosed invention, from a study of the drawings and the present disclosure.

The indefinite article "a" or "an" does not exclude a plurality.

A single unit or device can fulfil the functions of several items recited in the present disclosure. The mere fact that certain measures are recited in mutually different dependent embodiments does not indicate that a combination of these measures cannot be used to advantage.

Any reference signs in the present disclosure should not be construed as limiting the scope.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS USED IN THE FIGURES (PART OF THE DESCRIPTION)

10, 10', 10" Adaptive camera system
12 First camera arrangement
14 Second camera arrangement
16 Third camera arrangement
18 Fourth camera arrangement
Fifth camera arrangement
22 Camera unit
24 Image processing unit
26 Image data
27 Data communication connection
28 Processed data
30 Camera arrangement selection unit
32 CAN bus
100 Vehicle
200 Driver assistance system
300 Driving-status determination unit
700 Method
700-712 Method steps
A Jump point
BS Bottom section of the front side of the vehicle
CAS Current arrangement state
CS Current speed of the vehicle
D1 View direction of first camera arrangement
D2 View direction of second camera arrangement
D3 View direction of third camera arrangement
D4 View direction of fourth camera arrangement
D5 View direction of fifth camera arrangement
DS Driving status data
DT Direction of travel
FS Front side of the vehicle
FV1 Field of view of first camera arrangement
FV2 Field of view of second camera arrangement
FV3 Field of view of third camera arrangement
FV4 Field of view of fourth camera arrangement
FV5 Field of view of fifth camera arrangement
G Current gear of the vehicle
I Illumination condition
L Left side of the vehicle
P Current position of the vehicle
R Right side of the vehicle
RC Current road congestion
RS Rear side of the vehicle
S Select signal
ST Speed threshold amount
SR1 Spectral response of first camera arrangement
SR2 Spectral response of second camera arrangement
TD Current time of driving
TS Top section of the front side of the vehicle
UA Urban area
WC Current weather condition

The invention claimed is:

1. An adaptive camera system for a vehicle, the adaptive camera system comprising:
  a plurality of camera arrangements, wherein each camera arrangement comprises at least one camera unit, and wherein each camera arrangement is arranged on the vehicle such that each camera arrangement is configured to have respective different optical properties to cover a respective different field of view and/or to have a respective different spectral response,
  wherein the plurality of camera arrangements are adapted to be connected in data-communication to an image processor that is configured to receive image data from the camera arrangement; and
  a camera arrangement selector configured to receive driving-status data pertaining to an actual status of the vehicle,
  wherein the camera arrangement selector is adapted to select from the plurality of camera arrangements, using the driving-status data, at least one preferred camera arrangement for being connected in data-communication to the image processor,
  wherein a first camera arrangement is arranged on a top section of a front side of the vehicle, and a second camera arrangement is arranged on a bottom section of the front side of the vehicle,
  wherein the camera arrangement selector is configured to select, as the at least one preferred camera arrangement, the second camera arrangement, upon determining, based on the driving-status data, that a speed of the vehicle is higher than a predetermined speed threshold amount and that the vehicle is currently located in an urban area, and otherwise to select the first camera arrangement as the at least one preferred camera arrangement,
  wherein a data-communication connection to the image processor is restricted to the at least one preferred camera arrangement for data-communication with the image processor, and
  wherein the driving-status data and a predetermined selection-algorithm associating driving-status data to a corresponding subset of preferred camera arrangements is configured to provide to the image processor a select-signal indicative of the subset of preferred camera arrangements.

2. The adaptive camera system of claim 1, wherein the image processor is configured to receive image data restricted to image data from the at least one preferred camera arrangement, and/or
  wherein the data-communication connection is restricted to the at least one preferred camera arrangement as being configured to send image data to the image processor.

3. The adaptive camera system of claim 1, wherein the at least one preferred camera arrangement is selected for being connected in data-communication based on an evaluation of the driving-status data, such that a single camera arrangement of the plurality of camera arrangements is selected as a preferred camera arrangement.

4. The adaptive camera system of claim 1, wherein the image processor is configured to receive the select-signal and to process image data received only from the subset of preferred camera arrangements indicated by the select-signal.

5. The adaptive camera system of claim 1, wherein a subset of preferred camera arrangements are selected from the plurality of camera arrangements for being connected in data-communication to the image processor.

6. The adaptive camera system of claim 1, wherein the image processor is adapted for evaluating processed data from the image data and/or providing processed data to a driver assistance system, wherein the image data is restricted to that provided by the at least one preferred camera arrangement only.

7. The adaptive camera system of claim 1, wherein the driving-status data is indicative of a direction of travel of the vehicle, a current gear used by the vehicle, a current speed of the vehicle, a position of the vehicle, a current time of driving, a current state of road congestion, a state of a respective camera arrangement indicative of whether the camera unit is currently blocked, current weather or illumination conditions, or any combination thereof.

8. The adaptive camera system of claim 1, wherein each camera arrangement comprises one camera unit.

9. The adaptive camera system of claim 1, wherein:
 a third camera arrangement is arranged on a rear side of the vehicle, and/or
 a fourth camera arrangement is arranged on a left side of the vehicle, and/or
 a fifth camera arrangement is arranged on a right side of the vehicle.

10. The adaptive camera system of claim 9 further including the third camera arrangement, wherein the camera arrangement selector is configured to select, as the at least one preferred camera arrangement, the third camera arrangement upon determining, based on the driving-status data, that the vehicle is travelling backwards or upon determining that a reverse gear is in use.

11. The adaptive camera system of claim 9, further including the fourth camera arrangement and the fifth camera arrangement, wherein the camera arrangement selector is configured to further select, as the at least one preferred camera arrangement, the fourth camera arrangement upon determining, based on the driving-status data, that the vehicle is turning to the left and to further select, as the at least one preferred camera arrangement, the fifth camera arrangement upon determining, based on the driving-status data, that the vehicle is turning to the right.

12. A method for operating an adaptive camera system of a vehicle, the method comprising:
 providing a plurality of camera arrangements, wherein each camera arrangement comprises at least one camera unit, and wherein each camera arrangement is arranged on the vehicle such that each camera arrangement is configured to have respective different op tical properties to cover a respective different field of view and/or to have a respective different spectral response;
 connecting the plurality of camera arrangements in data-communication to an image processor configured to receive image data from the camera arrangements;
 receiving driving-status data pertaining to an actual status of the vehicle;
 selecting from the plurality of camera arrangements, using the driving-status data, at least one preferred camera arrangement for being connected in data-communication to the image processor, wherein a first camera arrangement is arranged on a top section of a front side of the vehicle, and a second camera arrangement is arranged on a bottom section of the front side of the vehicle, and wherein the second camera arrangement is selected as the at least one preferred camera arrangement, upon determining, based on the driving-status data, that a speed of the vehicle is higher than a predetermined speed threshold amount and that the vehicle is currently located in an urban area, and otherwise the first camera arrangement is selected as the at least one preferred camera arrangement;
 restricting a data-communication connection to the image processor to the at least one preferred at camera arrangement for data-communication with the image processor; and
 providing a select-signal indicative of a subset of preferred camera arrangements, wherein a predetermined selection-algorithm associates the driving-status to a corresponding subset of preferred camera arrangements.

13. The method of claim 12, further comprising ascertaining information pertaining to a current status of the vehicle and to providing the driving-status data indicative thereof.

14. The method of claim 12, further comprising receiving, at a driver assistance system, the processed image data from the at least one preferred camera arrangement.

15. An adaptive camera system for a vehicle, the adaptive camera system comprising:
 a plurality of camera arrangements, wherein each camera arrangement comprises at least one camera unit, and wherein each camera arrangement is arranged on the vehicle such that each camera arrangement is configured to have respective different optical properties to cover a respective different field of view and/or to have a respective different spectral response,
 wherein the plurality of camera arrangements are adapted to be connected in data-communication to an image processor that is configured to receive image data from the camera arrangement; and
 a camera arrangement selector configured to receive driving-status data pertaining to an actual status of the vehicle,
 wherein a first camera arrangement is arranged on a top section of a front side of the vehicle, and a second camera arrangement is arranged on a bottom section of the front side of the vehicle,
 wherein the camera arrangement selector is adapted to select from the plurality of camera arrangements, using the driving-status data, at least one preferred camera arrangement for being connected in data-communication to the image processor,
 wherein the camera arrangement selector is configured to select, as the at least one preferred camera arrangement, the second camera arrangement, upon determining, based on the driving-status data, that a speed of the vehicle is higher than a predetermined speed threshold amount and that the vehicle is currently located in an urban area, and otherwise to select the first camera arrangement as the at least one preferred camera arrangement,
 wherein a data-communication connection to the image processor is restricted to the at least one preferred camera arrangement for data-communication with the image processor, and
 wherein the image processor is adapted for evaluating processed data from the image data and/or providing processed data to a driver assistance system, wherein the image data is restricted to that provided by the at least one preferred camera arrangement only.

* * * * *